Figure 1:
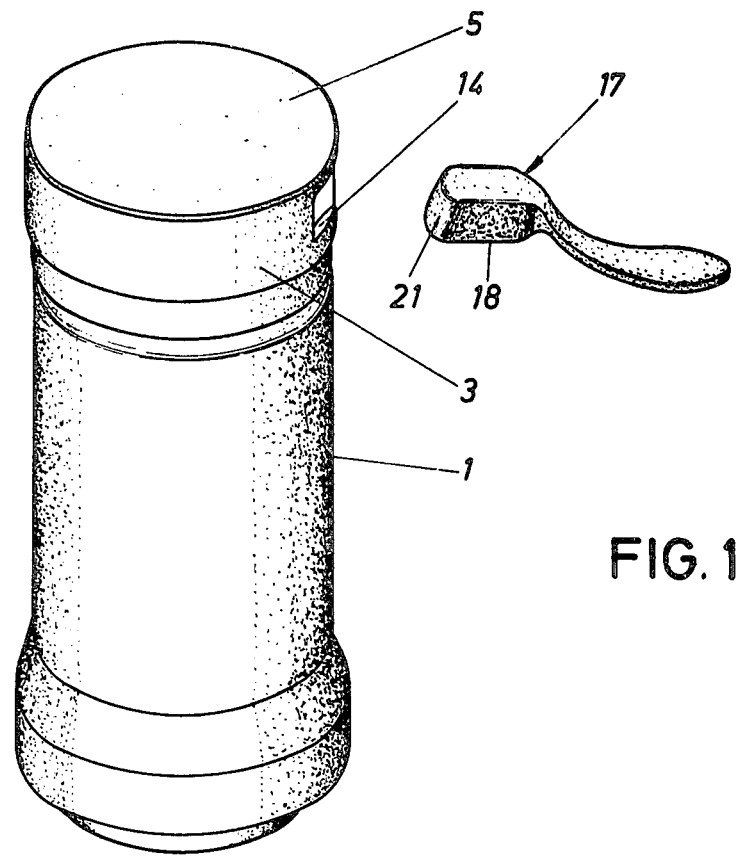

United States Patent [19]

Wippermann

[11] 4,232,718
[45] Nov. 11, 1980

[54] DEVICE FOR THE PORTIONED REMOVAL OF GRANULES

[76] Inventor: Gerhard Wippermann, Boerholz 72, 4057 Brüggen 2, Fed. Rep. of Germany

[21] Appl. No.: 958,400

[22] Filed: Nov. 7, 1978

[30] Foreign Application Priority Data

Nov. 8, 1977 [DE] Fed. Rep. of Germany ....... 2749831
Jun. 1, 1978 [DE] Fed. Rep. of Germany ....... 2824016

[51] Int. Cl.² .............................................. B65B 1/06
[52] U.S. Cl. .................................................. 141/358
[58] Field of Search .............. 222/362, 363, 355, 361; 141/351, 356, 358

[56] References Cited

U.S. PATENT DOCUMENTS

| 262,214 | 8/1882 | Fleming | 141/358 |
|---|---|---|---|
| 2,074,344 | 3/1937 | Sacharow | 222/361 X |
| 2,903,024 | 9/1959 | Lohse | 141/358 X |
| 4,130,149 | 12/1978 | Hausam | 141/358 |

Primary Examiner—Stanley H. Tollberg
Attorney, Agent, or Firm—Martin A. Farber

[57] ABSTRACT

A device for the dosed removal of granulates from storage containers, particularly hosehold packages of coffee, tea or the like. Underneath a discharge opening in the bottom wall there is a channel for the pushing in a spoon which is adjusted positively to the channel cross-section. A closure slider in the channel can be pressed back against spring action. The trough edge of the spoon spans a larger surface than that of the discharge opening and its front face edge which presses back the closure slider is adjusted to the shape of the front surface of the closure slider.

13 Claims, 14 Drawing Figures

U.S. Patent   Nov 11, 1980   Sheet 1 of 7   4,232,718

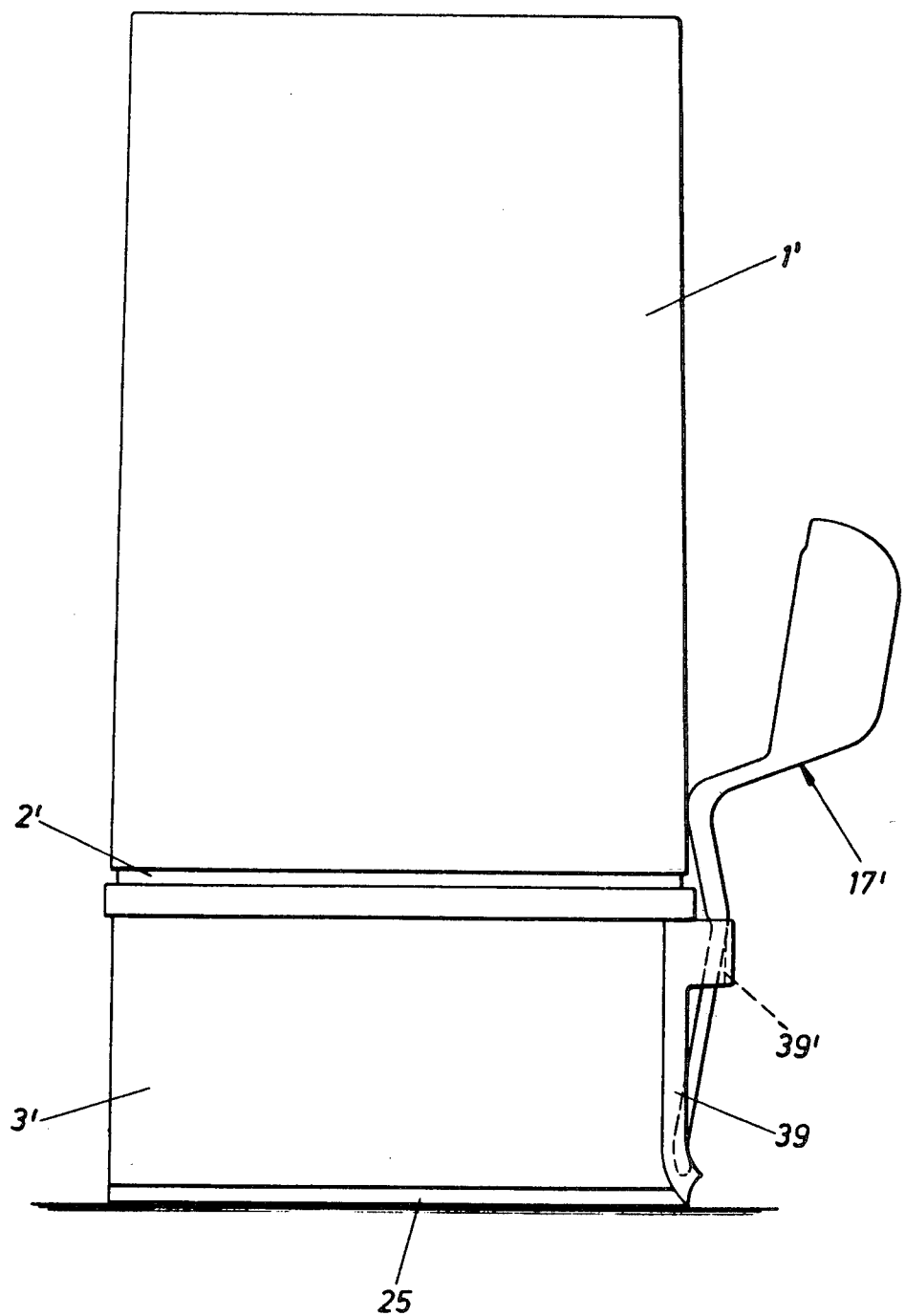

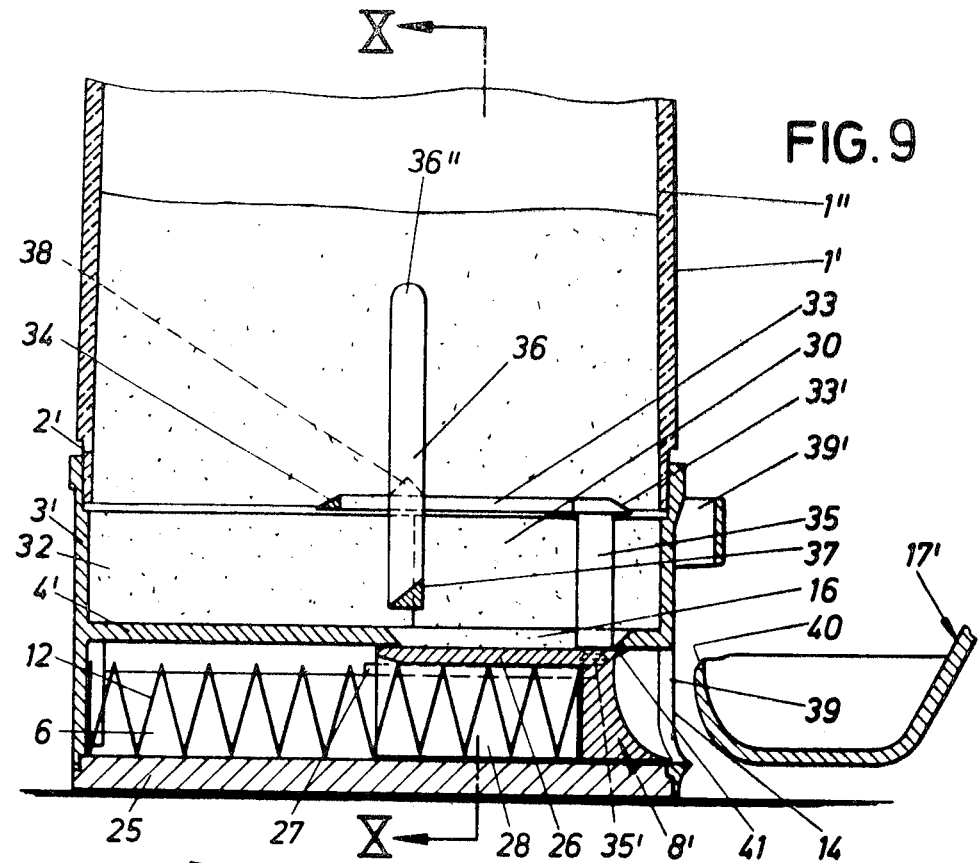

DEVICE FOR THE PORTIONED REMOVAL OF GRANULES

The invention relates to a device for the portioned removal of granules from storage containers, particularly household packages of coffee, tea or the like.

The subject of the invention is based on the task particularly, i.e. additionally to the tasks resulting from the specification and claims, to form a device of the previously set forth type in a simple manner of production technique which is advantageous in use such that the opening of the storage container is derived from the removal movement.

This task is solved in the manner that underneath a discharge opening in the bottom wall there is located a channel for the pushing-in of a spoon, the spoon being adjusted positively to the channel cross-section, the channel containing a closure slider which is pressable back against spring action, the channel opening toward the transverse side, the trough edge of the spoon comprises a larger surface than that of the discharge opening and its front face edge which edge presses back the closure slider is adjusted to the shape of the front surface of the closure slider.

As a consequence of such formation a device of the previously set forth type is provided of increased utility. The opening of the discharge opening is derived from the removal movement. During the insertion of the closure slider in the channel, which channel is located under the bottom wall, simultaneously the front face edge of the spoon displaces the closure slider. Thus the previously described operation can take place in the course of the one-hand servicing. The handling is thereby made considerably easier, and always precisely portioned quantities can be removed from the storage container. Since the front face edge of the spoon is adjusted to the shape of the front surface of the closure slider, during the displacement of the closure slider and of the spoon, respectively, with simultaneous opening of the discharge opening no granulate can fall unwanted in the channel. The same arrives only in the trough of the spoon. Following along with the withdrawal of the spoon from the channel, the slider moves as a consequence of the spring biasing into the closing position. This means that with the removed spoon the discharge opening is always closed. Moreover only momentary opening times exist so that the solution in accordance with the invention is suitable with supply containers which contain aromatic materials.

An advantageous further formation resides in that the closure slider runs between two guide ribs which are provided on the lower side of the bottom and which serve for the engagement of the side edges of the spoon. On the one hand the guide ribs bring about a saving of material, and on the other hand they cause an untilting guiding of the spoon.

Furthermore it proves advantageous that the front surface of the closure slider is shaped concave and the front face edge of the spoon is shaped correspondingly convex. With the slider disposed in the closing position thus the latter does not project over the transverse side of the supply container. The shaping of the closure slider and spoon adjusted or matched to one another compel a centering of the spoon during the insertion, which simplifies the handling.

A further advantageous feature is realized in the manner that the front surface of the closure slider and the front face surface of the spoon are formed as curved surfaces complementary to one another.

As a consequence of the surface-formed support of the spoon on the closure slider there exist low specific loads or stresses which increase the service life of the device.

The locking position of the closure slider in a simple manner is limited in that the edges of the push-in opening of the channel form the abutment surfaces for the closure slider.

With supply containers formed in the shape of coffee jars or glasses, tea jars, etc., the bottom wall is formed by an intermediate wall of a cap-like screw cover. The height of the cover can have nearly the same measure as the known cover. For the removal of the granulate which is located in these glassy supply containers, the glass is to be set on the screw cover. With the insertion of the spoon then there occurs the introductory explained portioned removal of the granulate. This can also result when the glass is correspondingly held in the course of the one-hand servicing. The aroma losses in this manner to the contrary to the known coffee glasses, tea glasses, etc. are considerably reduced. With respect to the screw cover it can be a vendor's component, which after emptying of the supply container again is usable on a full supply container.

It is favorable from a technical production viewpoint that the closure slider is U-profiled in longitudinal section and the face edges of the U-legs run on the lower wall of the channel. The U-shape leads to a saving in weight. Nevertheless the sufficient guiding and stability is maintained.

From a removal point of view it is advantageous that the forwardmost curvature range of the edge of the discharge opening lies in the closing position spaced from the front surface of the closure slider. This spacing causes a certain idle stroke, whereby however the discharge opening is still closed. That means that the freeing of the discharge opening can only occur if the spoon was inserted by a corresponding degree.

So that the satisfactory proportioned removal is guaranteed even with granulate which tends to lump, the closure slider carries on its one wide side a spike which is directed inwardly of the container through the discharge opening.

With each stroke of the closure slider, caused by the insertion movement of the spoon, the spike causes a loosening of the granulate.

Moreover an advantageous feature still resides in that the trough edge of the spoon comprises a substantially rectangular surface.

The rectangular shape favors the suitable guiding of the spoon inside of the channel. However the rectangular form of a discharge opening is adjusted such that with a spoon located underneath the same, the trough of the spoon is completely filled.

So that the exactly dosed removal of the granulate independent of the filling level of the supply container and condition of the granulate is not impaired, above the bottom-sided discharge opening there is located at least one prechamber which is able to be covered in the closing position by means of a division wall which is connected with the closure slider.

The important advantage resides in that with a completely filled supply container by itself the prechamber which is adjacent to the discharge opening is freed from the bottom pressure resulting from the filling level of the container. There is thus present a zone in which the loosened granulate exerts no larger pressure forces. In this manner it is guaranteed that with the insertion of the spoon in the channel and the return movement of the closure slider, out from this supply chamber sufficient granulate falls into the trough of the spoon. The prechamber which is covered by the division wall, the latter being connected with the closure slider, thus has a larger volume than that of the spoon. Since with each displacement of the slider the division wall also makes this movement, this leads to a loosening of the granulate in the bottom area. Also with a moved-back closure slider, the prechamber stands in connection with the interior space of the container. With the closure movement then the division wall again arrives in its position covering the prechamber.

An advantageous feature resides thereby in that two prechambers, which are arranged on both sides of the discharge opening, form slide surfaces which taper inclined relative to the discharge opening. The feeding of the granulate is supported by these slide surfaces, which slide surfaces together form approximately a funnel or hopper opening.

Moreover it proves advantageous thereby that the prechambers stand in connection with a recess which is open toward the supply container and which recess is aligned parallel to the channel. By this measure an additional loosening of the granulate is achieved in the bottom area, which counteracts a lumping.

Advantages are thereby achieved from production and assembling techniques in the manner that the division walls which are connected to one another are carried by two spikes, the latter stepping in clipping connection to the closure slider and that two additional spikes originate from the division walls. In this manner the slider and division walls may be most simply connected with one another. The construction form has few parts. Moreover the spike which effects the connection between the closure slider and the division walls contributes to a loosening of the granulate. For this purpose there serve also the two additional spikes which point to the bottom range lying on the other side of the prechambers, so that over the entire bottom surface there exists distributed loosening means.

In order still to improve the action of the two additional spikes, the latter project over the division walls above and below, whereby the downwardly directed ends of the spikes are connected with one another by means of a transverse stay, the downwardly directed ends lying in the area of the recess, the transverse stay having an inclined surface sloping toward the rearward end of the channel, while each one scraper web which is roof-shaped in cross-section and materially in one integral piece with the division wall is coordinated laterally adjacent to each spike end which projects upwardly above the division wall. Beside an additional loosening of the granulate in the bottom area, this measure leads to the advantage of a substantially complete emptying of the supply container.

Small actuating forces are realized in the manner that the spikes are pointed and the edges of the division walls lie in the direction of movement of the slider.

For a loosening in the bottom area moreover still there contributes the fact that the storage container conically widens toward the cover.

The penetration of granulate in the channel is thereby effectively prevented in the manner that the front face edge of the spoon is overlapped by a leading edge of the closure slider during the insertion of the spoon, the front face edge pressing the closure slider back.

The spoon obtains an improved guiding in the push-in phase in the manner that a preguide projecting beyond the cover is coordinated to the push-in opening. By means of an eye of the preguide for holding of the spoon, the preguide fulfills an additional function.

Ergonomic advantages arise during the insertion of the spoon in the manner that the spoon has a gripping trough for the thumbs of the actuating hand.

Figure 2:
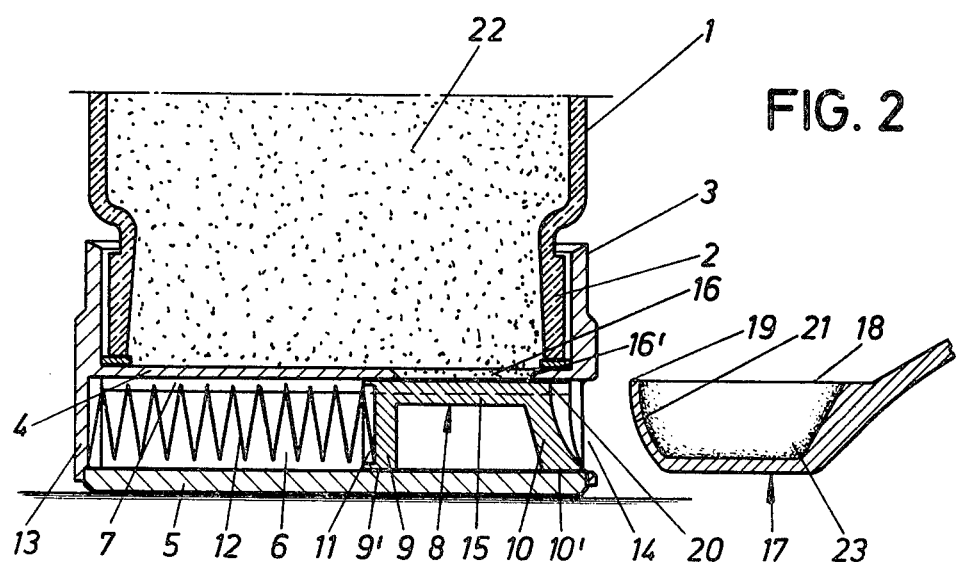
Figure 3:
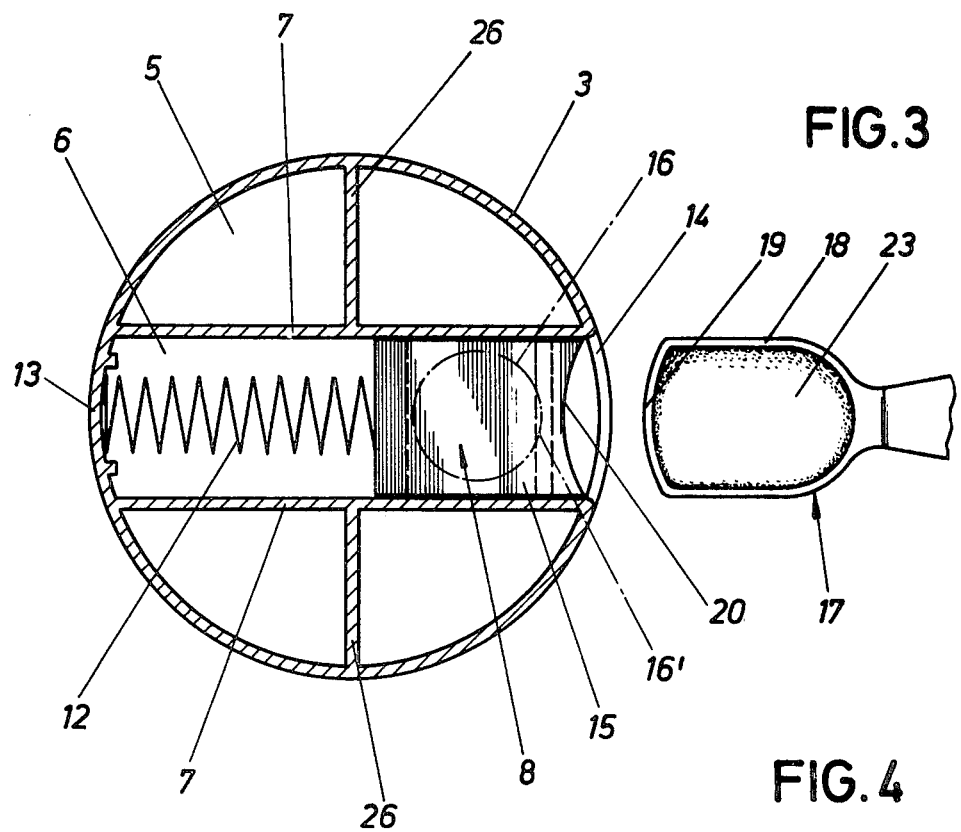
Figure 4:
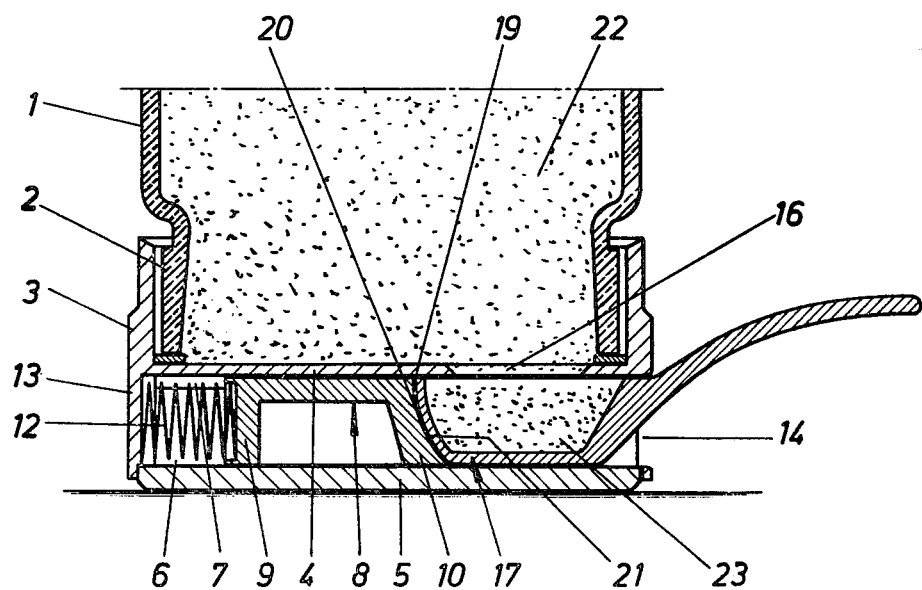
Figure 5:
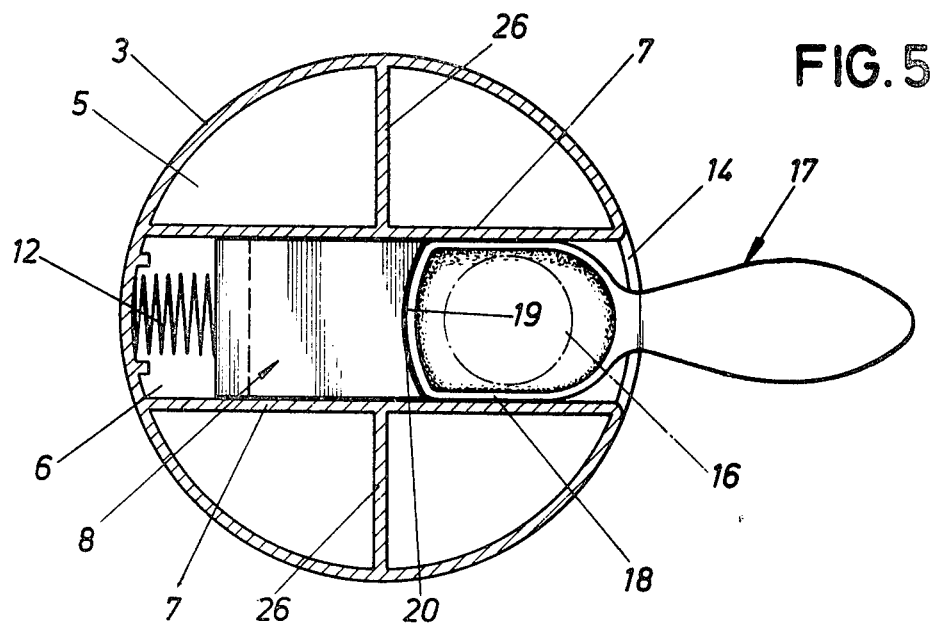
Figure 6:
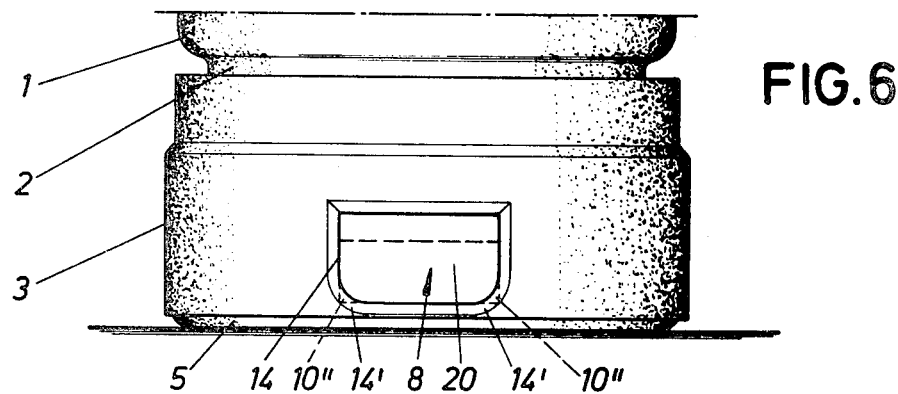
Figure 7:
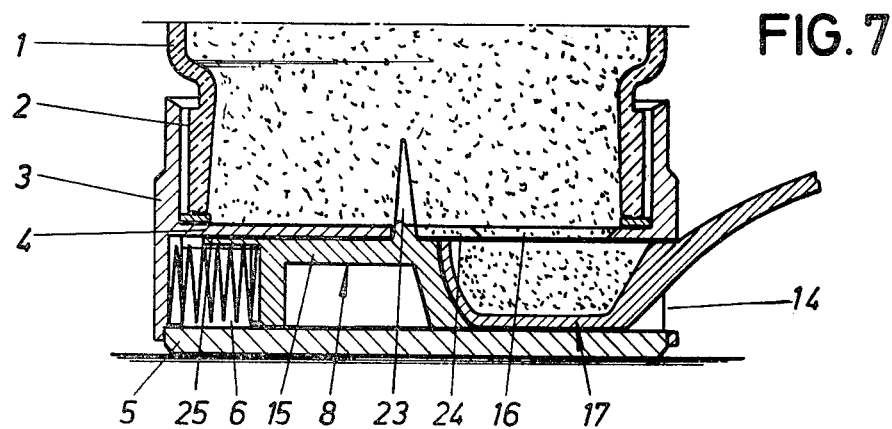
Figure 11:
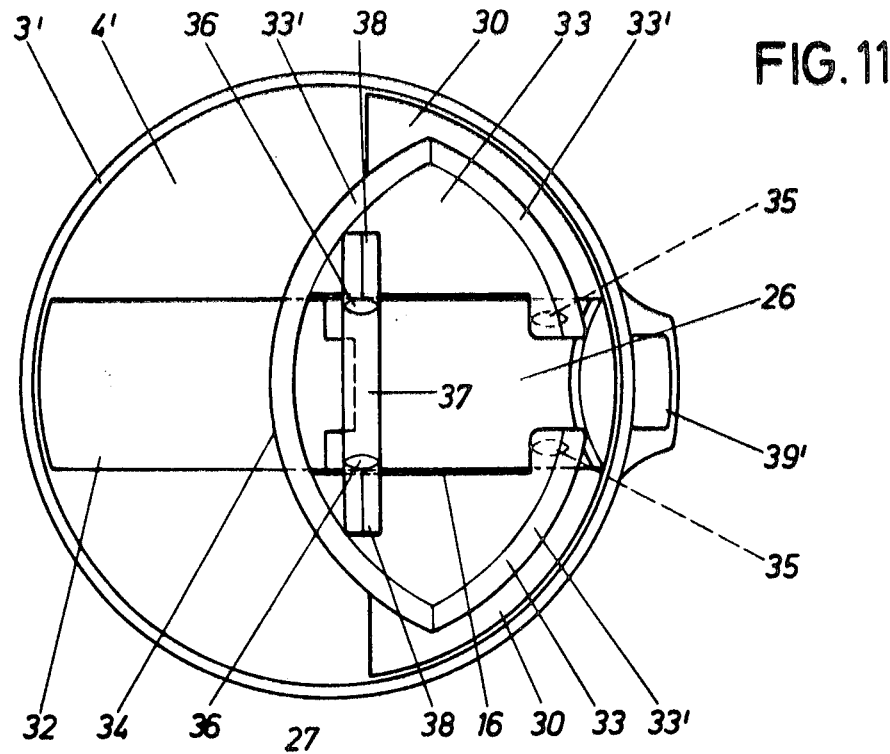
Figure 12:
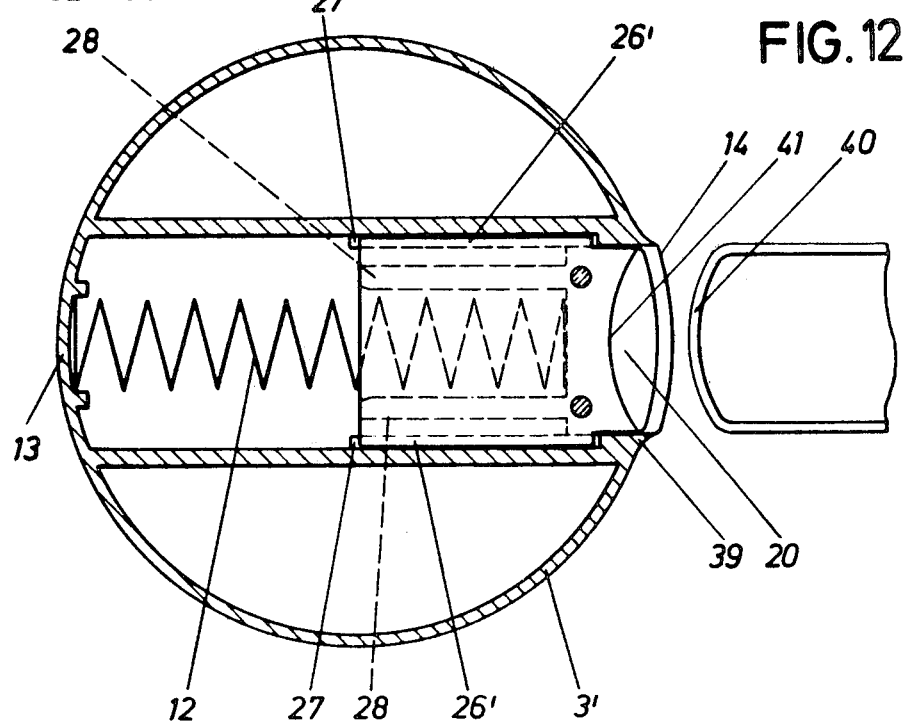
Figure 13:
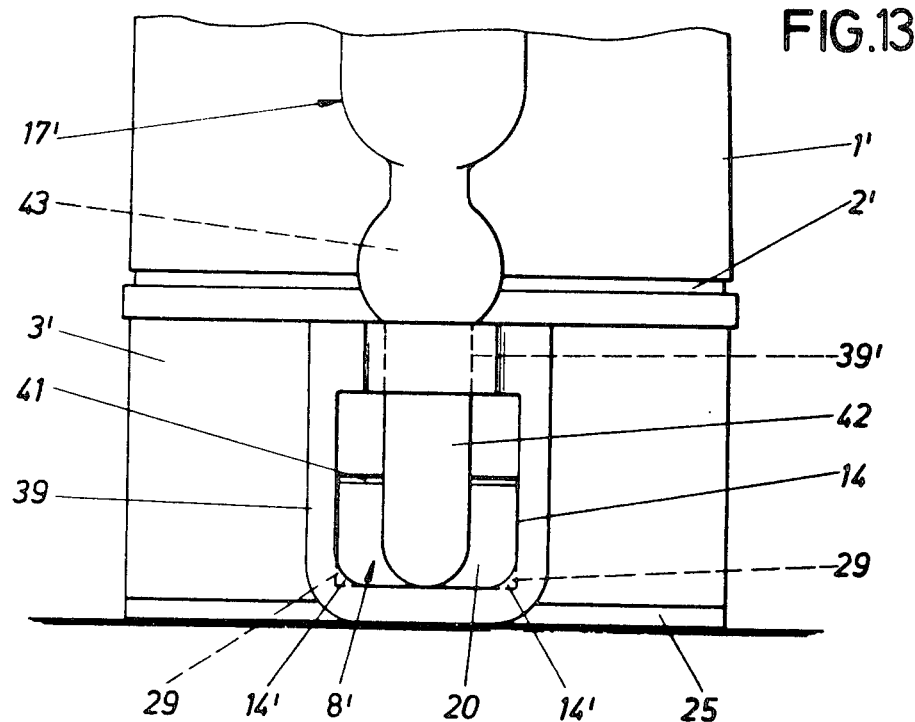
Figure 14:
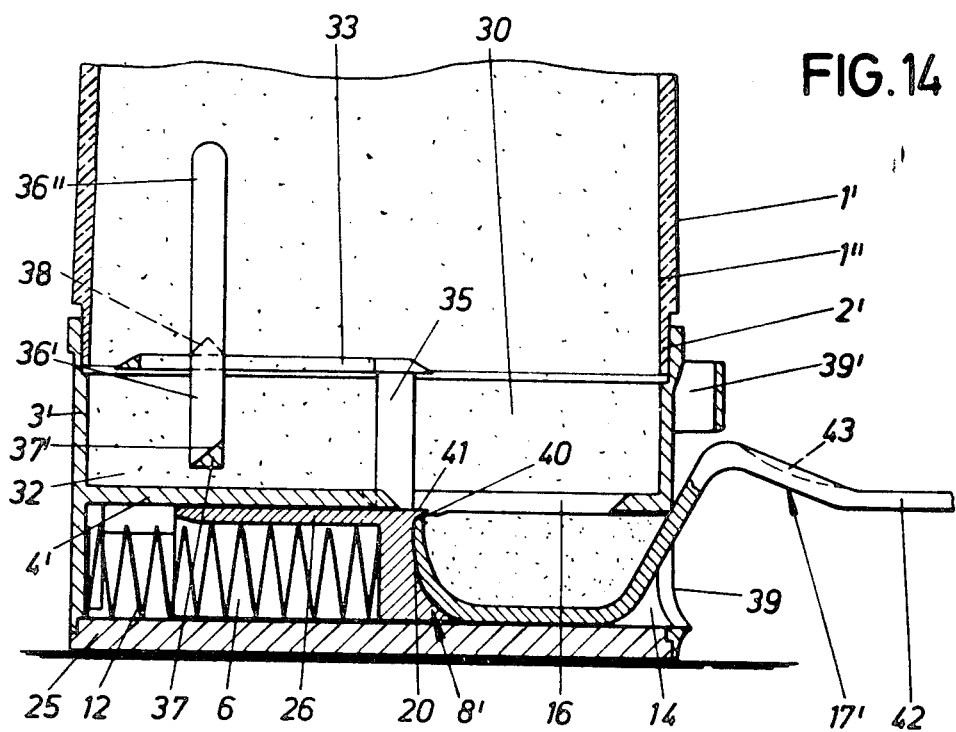

Three embodiment examples of the invention are explained in the following on the basis of FIGS. 1–14. It shows:

FIG. 1 in perspective illustration, a supply container formed as a coffee glass or jar with a spoon located in front of the push-in opening, FIG. 2 is a longitudinal section through the coffee jar which is set on the screw cover before the insertion of the spoon, FIG. 3 is a cross-section through the cover closely underneath the bottom wall, FIG. 4 is an illustration corresponding to FIG. 2, however with the inserted spoon and pressed back slider, FIG. 5 is a cross-section through FIG. 4 in the area underneath the bottom wall, FIG. 6 is a view toward the coffee jar in the range of the push-in opening, FIG. 7 is a longitudinal section through the supply container according to the second embodiment, FIG. 8 is a view of the supply container standing on its cover according to the third embodiment with associated spoon, FIG. 9 is a longitudinal section through the supply container before the insertion of the spoon, FIG. 10 is a section according to the line X—X in FIG. 9, FIG. 11 is a top plan view of the cover with a removed container, FIG. 12 is a cross-section through the cover in the area of the guide of the closure slider, FIG. 13 is a view toward the supply container in the area of the push-in opening and FIG. 14 is an illustration corresponding to FIG. 9, whereby the spoon is inserted in channel.

With the first and second embodiment example the supply container is formed as a coffee jar or glass 1. This has an edge 2 which is equipped with a thread (not illustrated), which edge carries the screw cover 3 which is made of plastic or synthetic material.

For removal of the coffee granules the coffee jar is set on the screw cover 3. In this manner the intermediate wall 4 of the screw cover 3 forms the floor or bottom wall of the coffee jar 1. The lower wall 5 of the screw cover extends parallel to the intermediate wall 4. The lower wall consequently serves as a setting surface for the coffee jar 1 which is set on the screw cover.

The radially aligned channel 6 is located between the lower wall 5 and the bottom wall 4. The radially aligned channel 6 is open toward one transverse side. The channel 6 obtains a lateral limitation or boundary by two guide ribs 7 which are provided on the bottom side of the floor, which guide ribs serve to guide the slider 8, the latter running in the channel. The slide 8 is U-shaped in the longitudinal section such that the face edges 9', 10' of the U-legs 9 and 10, respectively, slide on the lower wall 5 of the channel 6. The leg 9 contains a blind bore 11 in which the compression spring 12 penetrates.

The latter is supported on the edge 13 of the screw cover 3 and consequently biases the closure slider 8 in the direction of the push-in opening 14.

The push-in opening 14 has a smaller cross-sectional surface than the closure slider 8. Namely the lower edges 14' of the push-in opening 14 form abutment surfaces for the lower corners 10" of the leg 10 of the closure slider 8, compare FIG. 6. The U-stay 15 of the closure slider 8 extends, in the closure position of the same, in front of the discharge opening 16 of the intermediate wall 4. With the embodiment example this is a circularly-shaped opening with a frustoconically-shaped cross-section such that it faces or points to the base surface of the filling area of the coffee jar 1.

A spoon 17 serves for removal of coffee, the spoon being adjusted positively or complementarily to the channel cross-section. Its mouth edge 18 spans a larger surface than that of the discharge opening 16 of the intermediate wall 4. As evident from the figures, the face edge 19 is adjusted to the shape of the front surface 20 of the closure slider 8, the front face edge 19 pressing the closure slider 8 back.

For facilitating insertion of the spoon, the front face edge 19 of the spoon is convexly formed. Correspondingly the face surface 20 of the closure slider 8 is concave. For the purpose of a good engagement by the closure slider 8 and the spoon 17, the face surface 20 of the closure slider 8 and the face surface 21 of the spoon 17 are formed as curved surfaces complementary to one another. In this manner during the insertion of the spoon a centering is applied thereon.

As FIG. 5 particularly shows, the guide ribs 7 of the channel 6 in addition to the guiding of the closure slider 8 serve for engagement of the side edges of the spoon. It is further evident from this figure that the mouth edge 18 of the spoon comprises approximately a rectangular surface which is larger than the discharge opening 16.

In the closure position, compare FIGS. 2 and 3, the forward-most curved area 16' of the discharge opening 16 extends spaced apart from the front surface 20 of the closure slider 8. Consequently a certain empty or idle stroke is present. Only after exceeding this idle stroke does the closure slider open the discharge opening 16. The front area of the spoon 17 consequently already has been inserted a bit in the channel 6 and has already obtained its alignment.

The dosed or portioned removal of coffee granules 22 occurs in accordance with the following:

During the insertion of the spoon 17 into the push-in opening 14, the front surface 21 of the spoon acts on the front surface 20 of the closure slider 8 and presses this back against the action of the compression spring 12. The closure slider 8 frees or opens the discharge opening 16 so that coffee granules can arrive through this in the depression or trough of the spoon, compare FIGS. 4 and 5. After filling has taken place the spoon 17 is withdrawn from the channel. The compression spring 12 following along with this removal movement shifts the closure slider 8 into its closure position. This operation can be performed quickly. Since the discharge opening is opened only momentarily, an aromatic-tight closure is extensively realized.

With the variant illustrated in FIG. 7 the same parts carry the same reference numerals. Deviating from the previously described embodiment, the slider 8 on one of its wide sides has a spike 23 which is directed inwardly into the container through the discharge opening 16. In order to make the movement of the slider 8 possible, the discharge opening 16 is equipped with a radial slot 24.

Moreover the U-stay 15 which faces the intermediate wall 4 is provided with a tab-like extension 25 which is in the closure position of the closure slider 8 closes the slot 24. The entrance of coffee granules in the channel 6 consequently is effectively prevented. This embodiment form is selected if it relates to coffee which tends to lump, particularly powdered coffee.

Reinforcement stays 26 for the additional reinforcement of the interemediate wall 4 are provided on the lower side of the same transversely directed relative to the guide ribs 7.

The device illustrated in FIGS. 8–14 for the portioned removal of granules has the storage or supply container 1' made of a transparent material. This container is equipped with an inner wall 1" which conically widens toward the cover 3'. The edge 2' of the storage container in a suitable manner is connected with the cover 3'.

For removal of the coffee granules which are safeguarded in the supply container the supply container is set on the cover 3'. In this manner the intermediate wall 4' of the cover 3' forms the bottom wall or floor of the supply container 1'. The closure cap 25 of the cover 3' extends parallel to the intermediate wall 4', the closure cap 25 serving as the setting or standing surface for the supply container.

The channel 6 which is radially directed relative to the cover 3' extends between the bottom wall 4' and the closure cap 25. The channel 6 is open toward a transverse side of the cover 3'. The slider 8' runs in the channel 6. The slider has a U-shaped cross-section. The edges 26' of the U-stay 26 which run in the longitudinal direction of the channel are overlapped by guide ledges 27, the latter extending from the bottom side of the bottom wall 4'. The guide ledges 27 begin in the vicinity of the push-in opening 14 and end approximately centrally of the cover 3'. Legs 28 which are joined as an integral material unit on the U-stay 26 receive the compression spring 12 therebetween, which spring is supported on the edge 13 of the cover 3' and which spring biases the closure slider 8' in the direction of the push-in opening 14.

As evident from FIG. 13 the push-in opening 14 has a smaller cross-sectional surface than the closure slider 8'. The lower rounded edges 14' in this manner form abutment surfaces for the lower corners 29 of the closure slider 8'.

In the closing position the U-stay 26 extends in front of the discharge opening 16 of the bottom wall 4', which discharge opening 16 is adjacent the push-in opening 14.

The bottom wall 4' which is formed thicker compared to the two first embodiment forms is equipped with two prechambers 30 which are arranged on both sides of the discharge opening 16. The prechambers form slide surfaces 31 which taper-off inclined toward the disharge opening, whereby a funnel-shape is created. The prechambers 30 are in connection with a recess 32 which is open toward the supply container 1' and is aligned parallel to the channel 6.

In the closing position of the slider 8' the prechambers 30 are covered by division walls 33. A transverse stay 34 connects the two division walls 33 to one another. A spike or spur 35 extends from each division wall 33 in the area adjacent the push-in opening 14. The end 35' of the spike, which end points toward the slider 8', is clipped with the slider 8', compare FIG. 9. The assembling of the division wall 33 and of the slider 8' thus is able to be provided simplified. The latter is coordinated to the cover 3' such that the edges 26' are inserted into the guideless area of the channel 6. Then the slider 8' is to be moved into the closing position. Subsequently the spikes 35 of the division walls 33 can step in clipping relative to the slider. After the assembling of the slider 8' and the division walls 33, then the slider 8' no longer can completely step out of the range of the guide ledges 27.

The spikes 35 as evidenced from FIG. 11 are pointed in the displacement direction, such that approximately a lens-shaped cross-section exists.

In the vicinity of the rearward area of the division walls 33 two additional spikes 36 are provided. The latter project over the division walls 33 toward the top and toward the bottom. The lower ends 36' of the spikes 36 extend in the area of the recess 32 and there they are connected with one another by a transverse stay 37. The latter has the inclined surface 37' which tapers-off inclined toward the rearward end of the channel, which permits an easy displacement of the transverse stay 37 in the inward direction. Adjacent to each end 36" which projects above the division wall there is a scraper stay 38 which is roof-shaped in cross-section and extends from the division wall. The spikes 36 are likewise pointed in the displacement direction and have a lens-shaped cross-sectional form. For the ease of displacement of the slider 8' the divisional wall 33 are equipped with knife or cutter-shaped edges 33.

For the improved pushing-in of the spoon 17', a pre-guide 39 is formed on or attached to the cover 2' in the area of the push-in opening 14, which pre-guide 39 projects over the cross-sectional shape of the cover. The pre-guide 39 continues into an eye 39' for holding the spoon 17', compare FIGS. 8 and 13.

The cross-section of the spoon 17' is adjusted to that of the channel 6 and the front face edge 40 to the front surace 20 of the closure slider 8', the front face edge 40 pressing back the closure slider 8. From FIG. 9 it is evident that the front face edge 40 of the spoon 17' runs wedge-shaped. Correspondingly the slider 8' forms a cutter-shaped leading edge 41 which overlaps the front face edge 40 of the pushed-in spoon.

In the closing position of the storage container 1', the discharge opening 16 is completely covered by the slider 8'. During the introduction of the spoon 17' into the push-in opening, the pre-guide 39 lengthens the introduction for the spoon 17'. When this is pushed-in and arrives in engagement to the slider 8', it has a sufficient security against lateral tilting forces. During further pushing-in of the coffeee spoon 17', the latter engages the slider 8' and presses it back against the action of the compression spring 12. The closure slider 8' frees the discharge opening 16 so that the coffee granulate which is disposed on the one hand in the prechambers 30 and on the other hand above the discharge opening 16, can fall in the trough of the spoon, compare FIG. 14. Simultaneously the prechambers again fill up. The spikes 35, 36, transverse stay 37 and scraper stay 38 including the division wall edges 33' cause a loosening of the coffee granulate in the bottom area.

After filling has taken place the spoon 17' is pulled out from the channel 6. The compression spring 12 is displaced along with this removal movement of the closure slider 8' into its closing position.

The division walls 33 then arrive again in their position overlapping or covering the prechambers 30. The transverse stay 37 as also the scraper stay 38 cause a further loosening of the coffee granulate in the bottom range with this displacement back of the slider 8'. The transverse stay 37 particularly sees to it that the coffee granulate is fed to the discharge opening 16 from the area of the recess 32. An exactly dosed removal is thus extensively possible up to the complete emptying of the supply container.

In order to facilitate the insertion of the spoon 17', its spoon handle 42 forms a gripping trough 43 as the engagement surface for thumbs of the hand of use. It is thus guaranteed that even with moist and wet hands, respectively, the hand does not slip off the spoon.

I claim:

1. A device for the dosed removal of granules from storage containers, particularly household packages of coffee, tea or the like, comprising
   a storage container comprising,
   a bottom wall defining a discharge opening,
   means defining a channel under said bottom wall, said channel opening toward a transverse side of said storage container,
   a closure slider slidably disposed in said channel,
   a spoon adapted to be pushed into said channel, said spoon being shaped complementarily to the cross-section of said channel, said spoon forming a trough having an edge spanning a larger surface than that of said discharge opening, said spoon having a front face edge abuttingly pressing back said closure slider when said spoon is inserted in said channel,
   said closure slider being adapted to be pressed back against spring action, said closure slider being formed with a front surface,
   said front face edge of said spoon being shaped to the shape of said front surface of said closure slider,
   said bottom wall defines at least one prechamber above said discharge opening,
   at least one division wall connected with said closure slider,
   said at least one prechamber is covered by said at least one division wall in a closing position of said closure slider.

2. The device as set forth in claim 1, wherein
   said front surface of said closure slider is shaped concave and said front face edge of said spoon is shaped convex corresponding to that of said front surface of said closure slider.

3. The device as set forth in claim 1, wherein
   said spoon has a front face surface,
   said front surface of said closure slider and said front face surface of said spoon are formed as curved surfaces complementary to one another.

4. The device as set forth in claim 1, further comprising
   abutment edges defining a push-in opening communicating with said channel, said abutment edge form abutment surfaces abutting said closure slider in an end position of the latter.

5. The device as set forth in claim 1, wherein
   said closure slider is U-profiled in longitudinal section having U-legs terminating at face edges thereof,
   a lower wall of said channel,
   said face edges of said U-legs run on said lower wall of said channel.

6. The device as set forth in claim 1, wherein said bottom wall has slide surfaces forming two of said prechambers arranged on both sides of said discharge opening, said slide surfaces taper inclined relative to said discharge opening.

7. The device as set forth in claim 1, wherein
said storage container defines a recess which is open to said storage container, said recess is aligned parallel to said channel,
said at least one prechamber constitutes prechambers communicating with said recess.

8. The device as set forth in claim 1, wherein
said at least one division wall comprises division walls connected with one another,
two spikes carry said division walls, said two spikes step in clipping connection with said closure slider, and
two additional spikes extend from said division walls.

9. The device as set forth in claim 8, wherein
said storage container defines a recess which is open to said storage container and communicates with said at least one prechamber,
said additional spikes project above and below said division walls and include downwardly directed ends and upwardly projecting ends of said additional spikes projecting below and above said division walls, respectively,
a transverse stay connects said downwardly directed ends of said additional spikes with each other, said downwardly directed ends of said additional spikes lie in the vicinity of said recess, said transverse stay has an inclined surface sloping toward a rearward end of said channel,
one scraper stay having a roof-shaped cross-section and materialwise in one integral piece with said division wall is laterally adjacent to each upwardly projecting end of said additional spikes, respectively.

10. The device as set forth in claim 8, wherein
said spikes are pointed,
said division walls have edges which lie in the direction of movement of said closure slider.

11. The device as set forth in claim 1, further comprising
a cap-like screw cover screwed on said storage container,
said screw cover contains said bottom wall, the latter being formed by an intermediate wall,
said storage container conically widens toward said cover.

12. The device as set forth in claim 1, wherein
said closure slider is formed with a leading edge,
said leading edge of said closure slider overlaps said front face edge of said spoon during insertion of said spoon in said channel with said front face edge pressing against said closure slider.

13. The device as set forth in claim 12, wherein
said preguide means forms an eye means for holding said spoon.

* * * * *